United States Patent
Henriksen et al.

(10) Patent No.: US 12,270,373 B2
(45) Date of Patent: Apr. 8, 2025

(54) RELATING TO WIND TURBINE BLADE ROOT COVER

(71) Applicant: Vestas Wind Systems A/S, Aarhus (DK)

(72) Inventors: Niels Martin Henriksen, Beder (DK); Jan Kjærsgaard Petersen, Randers Nø (DK); Niels Thomas Bengtson, Hedensted (DK); Ole Mølgaard Jeppesen, Skjern (DK); Jesper Horsager Nielsen, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 80 days.

(21) Appl. No.: 17/783,030

(22) PCT Filed: Dec. 4, 2020

(86) PCT No.: PCT/DK2020/050346
§ 371 (c)(1),
(2) Date: Jun. 7, 2022

(87) PCT Pub. No.: WO2021/121497
PCT Pub. Date: Jun. 24, 2021

(65) Prior Publication Data
US 2023/0009729 A1 Jan. 12, 2023

(30) Foreign Application Priority Data
Dec. 20, 2019 (DK) .......................... PA 2019 70810

(51) Int. Cl.
*F03D 1/06* (2006.01)
*F03D 80/70* (2016.01)

(52) U.S. Cl.
CPC ......... *F03D 1/0691* (2013.01); *F03D 1/0675* (2013.01); *F03D 80/70* (2016.05); *F05B 2240/57* (2013.01)

(58) Field of Classification Search
CPC .... F03D 1/0675; F03D 1/0658; F03D 1/0691; F03D 1/065; F03D 1/066; F03D 1/0662;
(Continued)

(56) References Cited

U.S. PATENT DOCUMENTS

2010/0135607 A1 6/2010 Rogall et al.
2012/0070295 A1* 3/2012 Klein .................... F03D 1/0675
29/889.7
(Continued)

FOREIGN PATENT DOCUMENTS

CN 202338443 U 7/2012
DE 102009035248 A1 2/2011
(Continued)

OTHER PUBLICATIONS

Danish Patent and Trademark Office, Search and Examination Report in PA 2019 70810, Jul. 10, 2020.
(Continued)

*Primary Examiner* — Justin D Seabe
*Assistant Examiner* — Jackson N Gillenwaters
(74) *Attorney, Agent, or Firm* — Wood Herron & Evans LLP (57) ABSTRACT

A blade root cover segment suitable for fitting to a wind turbine blade to span a gap between the blade and a spinner cover. The blade root cover segment includes a first end and a second end and further includes a curved flange for abutting against a correspondingly curved surface of the wind turbine blade; a cover wall extending radially from the flange; and a tensioning band associated with the flange. The tensioning band includes a first end proximate to the first end of the blade root cover segment and a second end proximate to the second end of the blade root cover segment. The first end and the second end of the tensioning band include connection means for connecting with and applying tension between a like blade root cover segment. A blade root cover and a method of assembling a blade root cover are also provided.

32 Claims, 10 Drawing Sheets

(58) Field of Classification Search
CPC .... F03D 1/0664; F03D 1/0667; F03D 1/0669; F03D 1/0671
See application file for complete search history.

(56) References Cited

U.S. PATENT DOCUMENTS

| | | | |
|---|---|---|---|
| 2015/0147187 A1 | 5/2015 | Lipka | |
| 2016/0356263 A1* | 12/2016 | Schafer | F03D 1/0658 |
| 2018/0355842 A1* | 12/2018 | Badger | B33Y 80/00 |
| 2022/0228554 A1* | 7/2022 | Festner | F03D 1/0677 |

FOREIGN PATENT DOCUMENTS

| | | | |
|---|---|---|---|
| EP | 2597301 | A2 | 5/2013 |
| EP | 2947316 | A1 | 11/2015 |
| TW | 200920937 | A | 5/2009 |

OTHER PUBLICATIONS

European Patent Office, International Search Report and Written Opinion in PCT Application No. PCT?DK2020/050346, Feb. 24, 2021.

European Patent Office, examination report issued in EP Application No. 20824451.7, dated Sep. 25, 2024.

\* cited by examiner

RELATING TO WIND TURBINE BLADE ROOT COVER

FIELD OF THE INVENTION

The present disclosure generally relates to a scheme or apparatus for covering the interface between blades and a rotor hub of a wind turbine generator.

BACKGROUND OF THE INVENTION

In a typical 'horizontal axis' wind turbine, a nacelle mounted on a tower supports a rotor that includes a rotor hub and a plurality of blades. Each blade is connected at its root end to the rotor hub via a pitch bearing. The pitch bearing allows the blade to be rotated or 'pitched' about its axis. The rotor hub may be completely or partially housed by a spinner which protects the hub against environmental influences and improves the aerodynamic characteristics of the rotor.

Typically, a spinner includes a blade opening superimposed over each pitch bearing of the rotor hub and through which each blade extends. Usually, the blade openings in the spinner are larger than the diameter of the pitch bearings to allow for lateral movement of the blade during installation. As a result, once a blade is installed onto a pitch bearing, there remains an uncovered annular gap between the spinner and the blade. Through this gap, the rotor hub is exposed to the environment and is particularly vulnerable to water tracking along the blade towards the root, and from there into the rotor hub.

Known approaches for sealing the annular gap include cover profiles with at least one conical section angled so as to deflect water away from the gap. Approaches including more than one interacting cover profile are also known. Known cover profiles may be continuous around the gap circumference or divided into arc sections or segments and connected together. Current approaches typically require the use of a sealing substance (such as Sikaflex™) to seal any gaps caused by surface irregularities at the interfaces between the blade or spinner and the cover profile(s). Liquid sealants can be difficult and time consuming to apply on site and require dry, clean application conditions to function reliably.

It is against this background that the invention has been devised.

SUMMARY OF THE INVENTION

According to a first aspect of the invention there is provided a blade root cover segment suitable for fitting to a wind turbine blade to span a gap between the blade and a spinner cover, the blade root cover segment having a first end and a second end. The blade root cover segment comprises: a curved flange for abutting against a correspondingly curved surface of the wind turbine blade; a cover wall extending radially from the flange; and a tensioning band associated with the flange. The tensioning band comprises a first end proximate to the first end of the blade root cover segment and a second end proximate to the second end of the blade root cover segment, and wherein the first end and the second end of the tensioning band include connection means for connecting with and applying tension between a like blade root collar segment.

The invention also extends to a blade root cover comprising a plurality of blade root cover segments joined end-to-end into a loop.

The blade root cover segment is attachable to like segments and so together can form a string of cover segments linked together in a step-wise manner to form a complete blade root cover. The tensioning band is a separate component and preferably is made of a material that has a higher tensile strength than that of the main body of the blade root cover. Therefore, the force required to hold the blade root cover on the blade can be provided by the tension established in the tensioning band, so the blade root cover segments can be made to be relatively light weight because they don't need to be strong. One option is for the tensioning band to be a strip of steel, and for the cover segment to be made of plastics. Further benefits can be appreciated from considering how wind turbines are operated in extreme environmental conditions, with operational temperature requirements in the range of −50° C. to 70° C. Over this temperature range, thermal expansion of plastics parts is more significant than metal parts, and so the thermal dimensional stability of the stiffening band is advantageous because it ensures that the blade root cover remains securely attached to the blade over the required temperature range. Similarly, the metal stiffening band will not become brittle during low temperatures. The tensioning band may be a single component for each blade root cover segment or it may be comprised of multiple parts for each blade root cover segment. In one embodiment, it is two parts, one from each side and gathered in the centre. In an alternative embodiment, it is one part from each side gathered in the centre to a central part.

Another benefit of the invention is that since each blade root cover segment has a respective tensioning band, a damaged segment can be removed from the blade root cover without removing the entire assembled component. Maintenance can therefore be performed whilst the blade root cover is on the blade.

To help hold adjacent cover segments together, the first end and the second end of the cover segment may include complementary mating features. Preferably the mating features are defined on each end of the cover wall. The mating features permit adjacent cover segments to fit together and be held in position whilst the blade root cover is being assembled. In one embodiment, the complementary mating features includes a locking mechanism. This helps adjacent cover segments to be locked together before the adjacent tensioning bands are connected.

Although the complementary mating features may take various forms, in one embodiment they include a male feature on the first end of the cover wall and a female feature on the second end of the cover wall.

As a further enhancement, the flange may comprise sealing means for sealing against a surface of the blade. The sealing means may comprise at least one gasket element. The gasket element therefore seals against the underlying blade surface as the blade root cover element is secured thereto. As a result, there is no need to apply a liquid sealant.

To ensure that the tensioning band remains associated, linked, or otherwise attached to the blade root cover segment during handling and assembly, in one embodiment the tensioning band is retained on the blade root cover segment. The retaining may involve the tensioning band being retained in a channel defined in the flange.

The blade root cover segment may also include one or more strengthening webs extending between the flange and the cover wall. As the flange and the cover wall are relatively flat and thin components that extend at an angle from each other, the strengthening webs provide a structure that increases the rigidity of the cover segment without a significant increase in mass. The strengthening webs may be configured to retain the tensioning band on the blade root cover segment.

The connection means of the tensioning band may include a bracket that is connected to the flange. Brackets of respective tensioning bands of adjacent blade root cover segments may therefore be fastened together which therefore joins adjacent cover segments. An adjustable connector may be provided that is configured to connect to an adjacent tensioning band, for example between adjacent brackets, and adjust the separation therebetween.

In another aspect, the invention provides a method of installing a blade root cover on a wind turbine blade, wherein the blade root cover comprises a plurality of separate and mutually-connectable blade root cover segments. The method comprises:

supporting a first blade root cover segment on the blade, creating a blade root cover assembly by offering up a second blade root cover segment to the blade into a position adjacent to the first blade root cover segment, and connecting the second blade root cover segment to the first blade root cover segment connection means of each respective blade root cover segment, and connecting further blade root cover segments to the blade root cover assembly of first and second blade root cover segments to increase the circumferential length of the blade root cover assembly until a complete blade root cover is formed.

The step of supporting the first blade root cover segment on the blade may include suspending the first blade root cover element from a support that is separate to the blade.

Suspending the first blade root cover segment includes running a tether line from the first blade root cover segment to the support over an upper part of the blade root. It is noted that the use of a line is an option, but it may be possible to install the blade root cover without as well.

The method may further include moving the first blade root cover segment in a step-wise manner whilst connecting the further blade root cover segments to the blade root cover assembly.

The method may include pre-assembling the blade root cover on the blade, and then applying circumferential tension to the blade root cover by way of the tensioning means.

It will be appreciated that preferred and/or optional features of the first aspect of the invention may be combined with the other aspects of the invention. The invention in its various aspects is defined in the independent claims below and advantageous features are defined in the dependent claims below.

BRIEF DESCRIPTION OF THE DRAWINGS

The above and other aspects of the invention will now be described, by way of example only, with reference to the accompanying drawings, in which.

Note that features that are the same or similar in different drawings are denoted by like reference signs.

DETAILED DESCRIPTION OF EMBODIMENTS OF THE INVENTION

Figure 1:
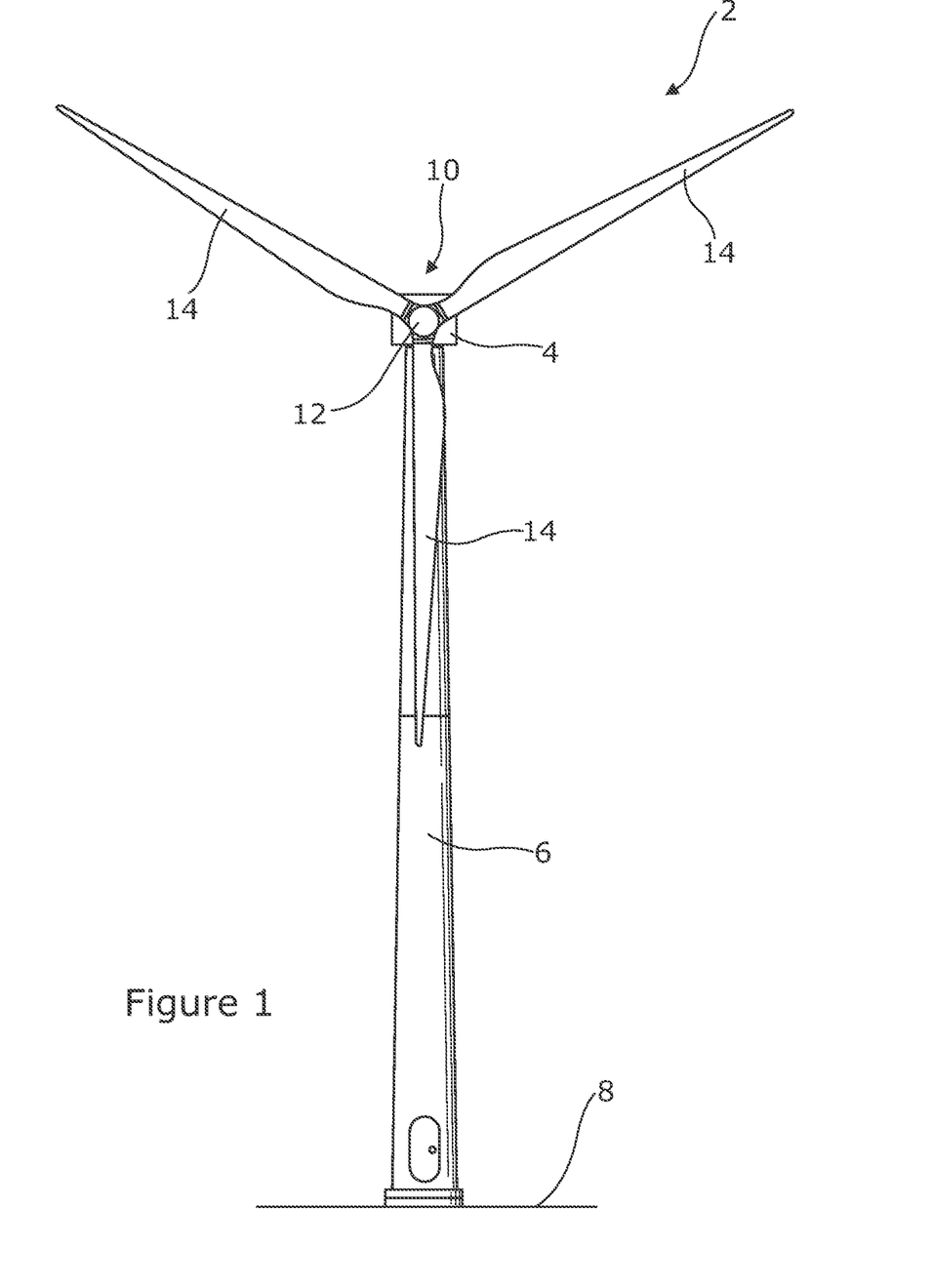
FIG. 1 is a front view of a horizontal axis wind turbine in which the embodiments of the invention may be incorporated.
Figure 2:
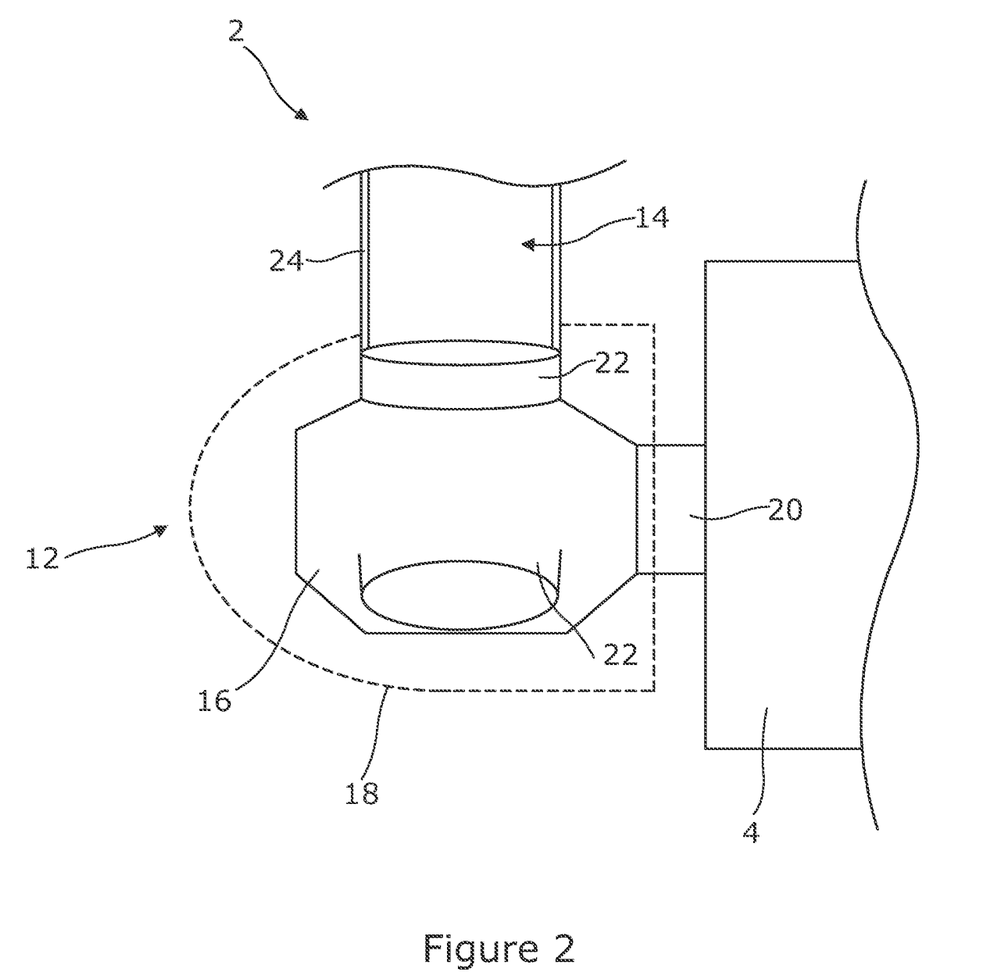
FIG. 2 is a schematic view which illustrates the components of a rotor hub of the wind turbine of FIG. 1, including a hub body, a spinner and a blade.

With reference to FIGS. 1 and 2, a wind turbine 2 includes a nacelle 4 that is supported on a generally vertical tower 6, which is itself mounted to a foundation 8. The foundation 8 may be on the land, or wholly or partially underwater. The nacelle 4 supports a rotatable rotor 10 which includes a rotor hub 12 at the front of the nacelle 4. The rotor hub has a set of blades 14 attached to it, which drive the rotor hub 12 to rotate in the usual way under the influence of a flow of wind.

As is known, the rotor hub includes a hub body 16 to which is attached a spinner cover or, more simply, "spinner" 18. The hub body 16 is the main structural member of the rotor hub 12 and is the component to which the blades 14 are attached and which is coupled to a main rotor shaft 20 of the wind turbine 2. Whereas FIG. 1 shows a broad view of the wind turbine 2, FIG. 2 depicts the rotor hub 12 schematically where the positional relationship between the hub body 16, the spinner 18 and the rotor blades 14 is more fully appreciated. The spinner 18 is an aerodynamic fairing, usually being a composite plastics construction, which protects the internal hydraulic and electrical systems (not shown) that are housed within the hub body 16 from the external environment. As can be seen, the hub body 16 includes a blade connection 22 for each rotor blade 14 (only one blade is shown in FIG. 2. Each blade connection 22 comprises a blade bearing (not shown) which has a circular flange to which a root portion 24 of the blade is attached. A pitch system (not shown) is housed within the hub body 16 and functions to rotate the pitch bearing and, thus, also the blade 14, about its longitudinal axis of the blade. Such an arrangement is typical in wind turbine design and so will not be described in further detail here for brevity.

Figure 3:
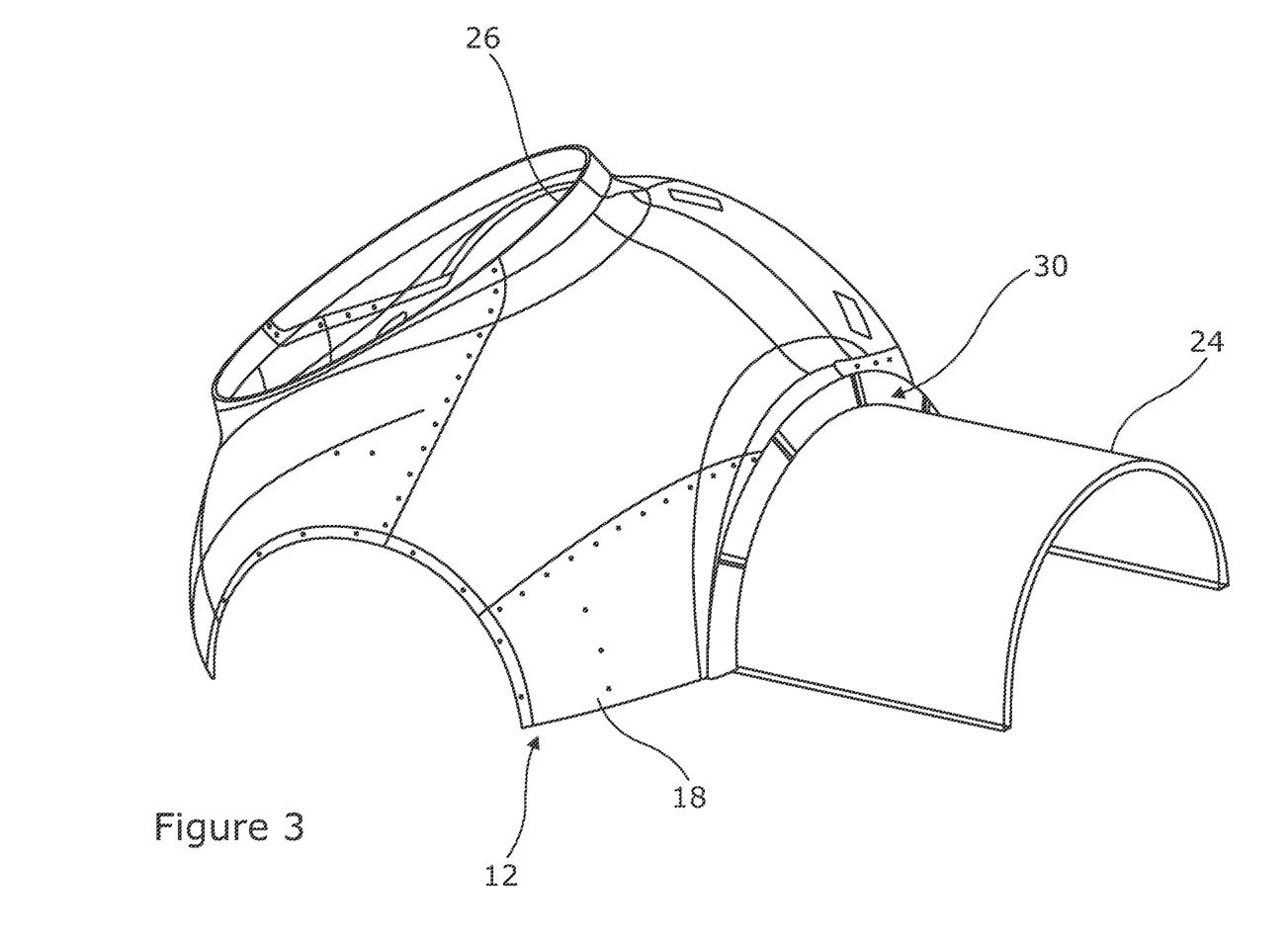
FIG. 3 is a perspective partial view of the spinner and blade as shown in FIG. 2, but also equipped with a blade root cover in accordance with an embodiment of the invention.

FIG. 3 shows a view of the spinner 18 and one of the blades 14. As can be seen, in this view the blade 14 extends laterally from the spinner 18 through a blade aperture 26.

Figure 4:
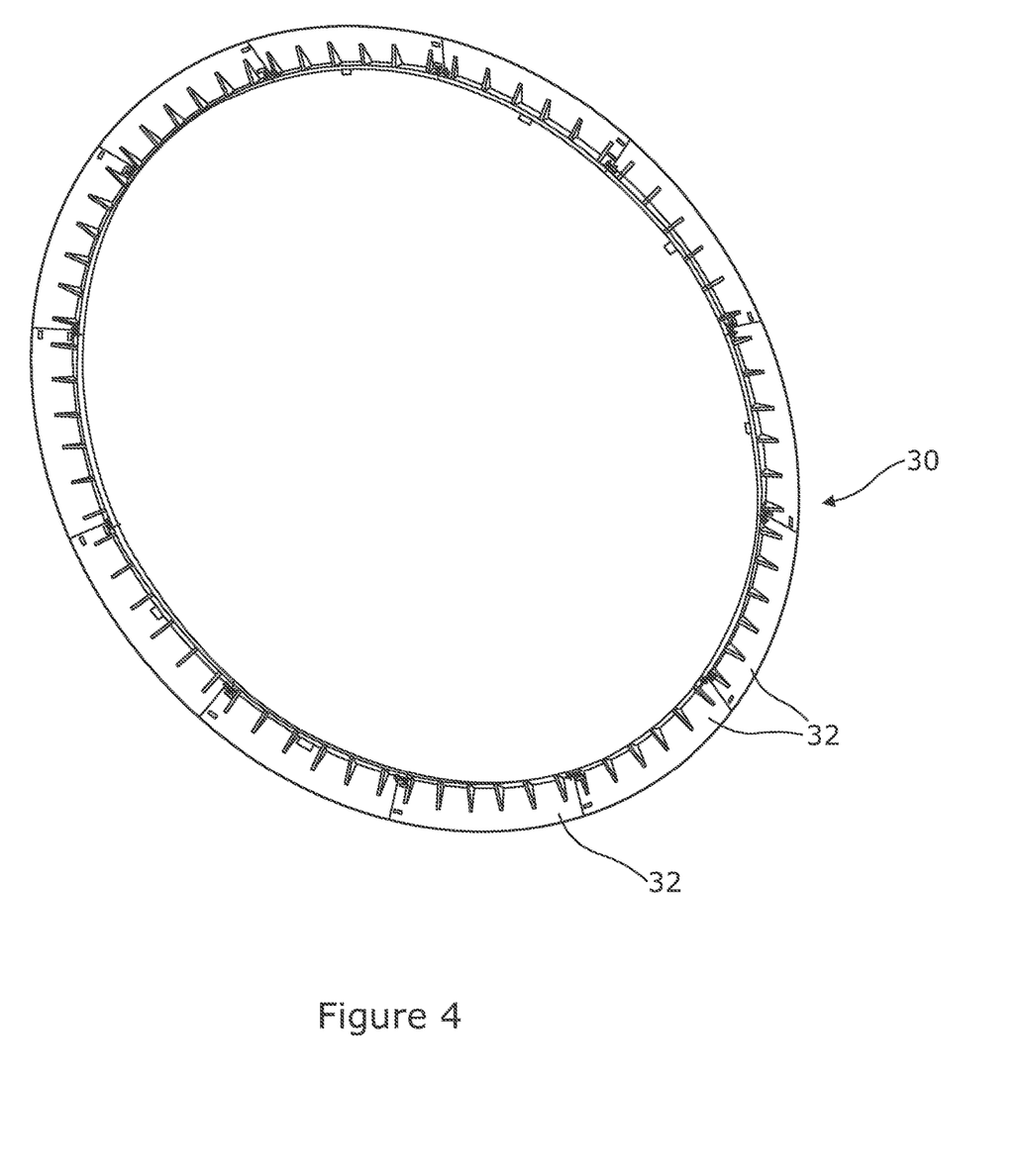
FIG. 4 is a perspective view of the blade root cover of FIG. 3, but shown in isolation.

In order to allow enough clearance for the blade 14 to pitch around its longitudinal axis, the blade aperture 26 of the spinner 18 defines a circumferential gap 28 (see FIG. 5) around the blade root portion 24. However, during wet weather this gap 28 serves as a means through which water can enter into the interior of the spinner 18 and, therefore, to the hub 12. It is important therefore to protect the hub from water ingress in general, and salt water can be particularly damaging. To this end, a blade root cover 30 is provided. In FIG. 3, the blade root cover 30 can be seen in situ mounted on the blade 14 so that it covers the annular gap, whereas FIG. 4 shows that the blade root cover 30 is an assembly of separate blade root cover segments 32 or sections, only three of which are labelled for brevity. In the illustrated embodiment, the blade root cover 30 includes twelve cover segments 32 in total. However, it should be understood that this is just an example and should not be considered limiting. More detail of each individual blade root cover segment 32 will be described in the discussion that follows.

Figure 5:
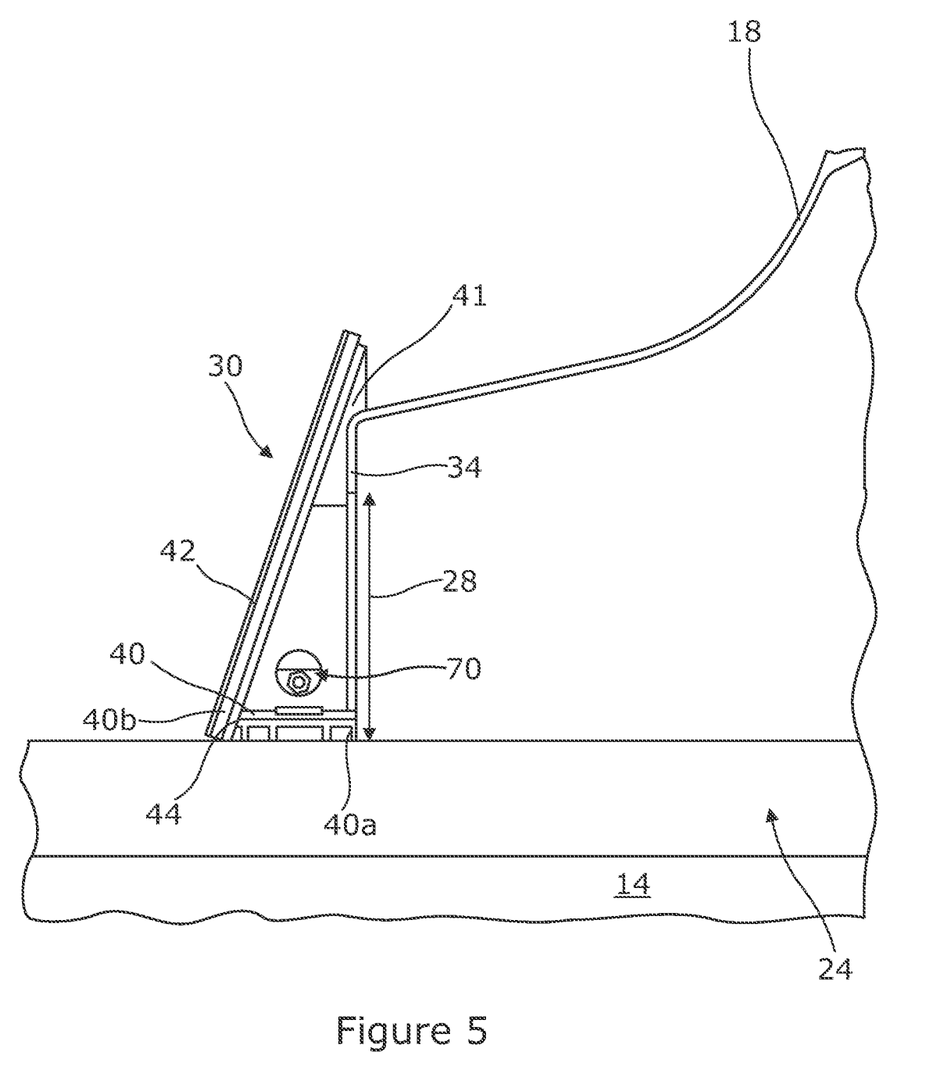
FIG. 5 is an illustrative section view of a portion of FIG. 3, which shows the relative positioning of the blade root cover, the blade and the spinner.

FIGS. 3 and 4 show the blade root cover 30 at a relatively high level of detail, but FIG. 5 shows a different perspective as a section through the root portion 24 of the blade 14, spinner 18 and the blade root cover 30. FIG. 5 illustrates clearly the annular gap 28 that is defined between a circumferential lip 34 of the spinner 18 and the blade 14, and how the blade root cover 30 is configured to guard against water ingress by covering the gap 28.

As can be seen in FIG. 5, the blade root cover 30 is generally L-shaped in cross section, as defined by a relatively narrow base or flange 40 and an upstanding wall 42. The wall 42 meets the flange at an elbow 44 such that the wall 42 is inclined relative to the flange 40. In this embodiment the wall 42 defines a high angle of inclination in the region of 60 degrees, by way of example only. Expressed another way, the cover wall 42 extends radially from the flange 40. In this sense, the term 'radial' does not mean a strict 90 degree angle between the flange and the cover wall, but rather that the cover wall is inclined such that when installed on the blade, the cover wall extends away from the flange so that the height of the wall increases in a radial dimension away from the blade.

The flange 40 has a dimension in the width direction defined by first edge 40a and a second edge 40b. The first edge 40a is a free edge whereas the second edge 40b connects to the inclined wall 42. Similarly, the flange 40 has a dimension in the length direction defined by a first end 40c and a second end 40d. The flange 40 abuts the adjacent surface of the blade 14 and so serves as the interface with the blade 14. The width of the flange 40 is configured so that the free edge 40a of the flange 40 is aligned radially with the circumferential lip 34 of the spinner 18 that defines the blade aperture 26. Note that the position of the blade root cover 30 is such that a small clearance gap 41 is established between the wall 42 and the spinner 18. The gap 41 may be useful to reduce wear on the blade root cover 30. Alternatively, the blade root cover 30 may be configured and fitted to the blade so that the wall 42 touches the spinner 18, which may improve resistance to weather.

Figure 6:
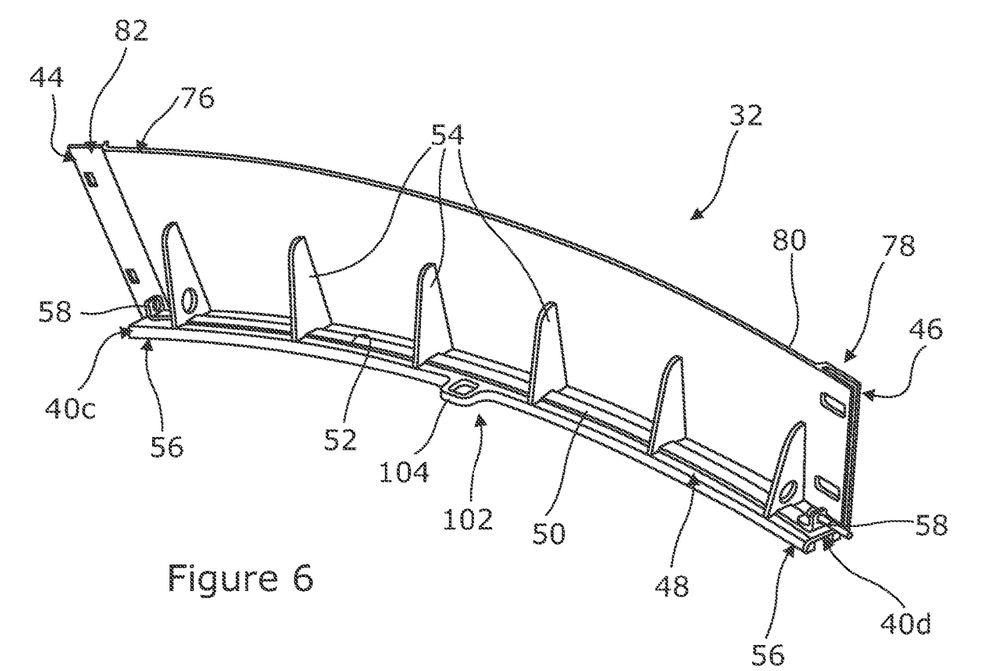
FIG. 6 is a perspective view of a portion of the blade root cover, which focuses on the interface or junction between adjacent blade root cover sections.
Figure 7:
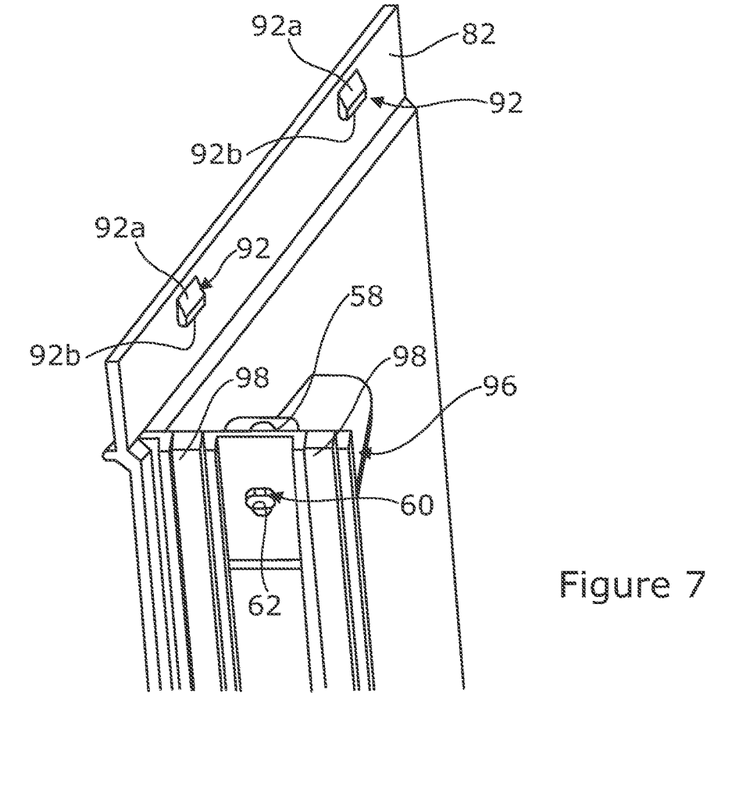
FIG. 7 is a perspective view of a single blade root cover section.
Figure 8:
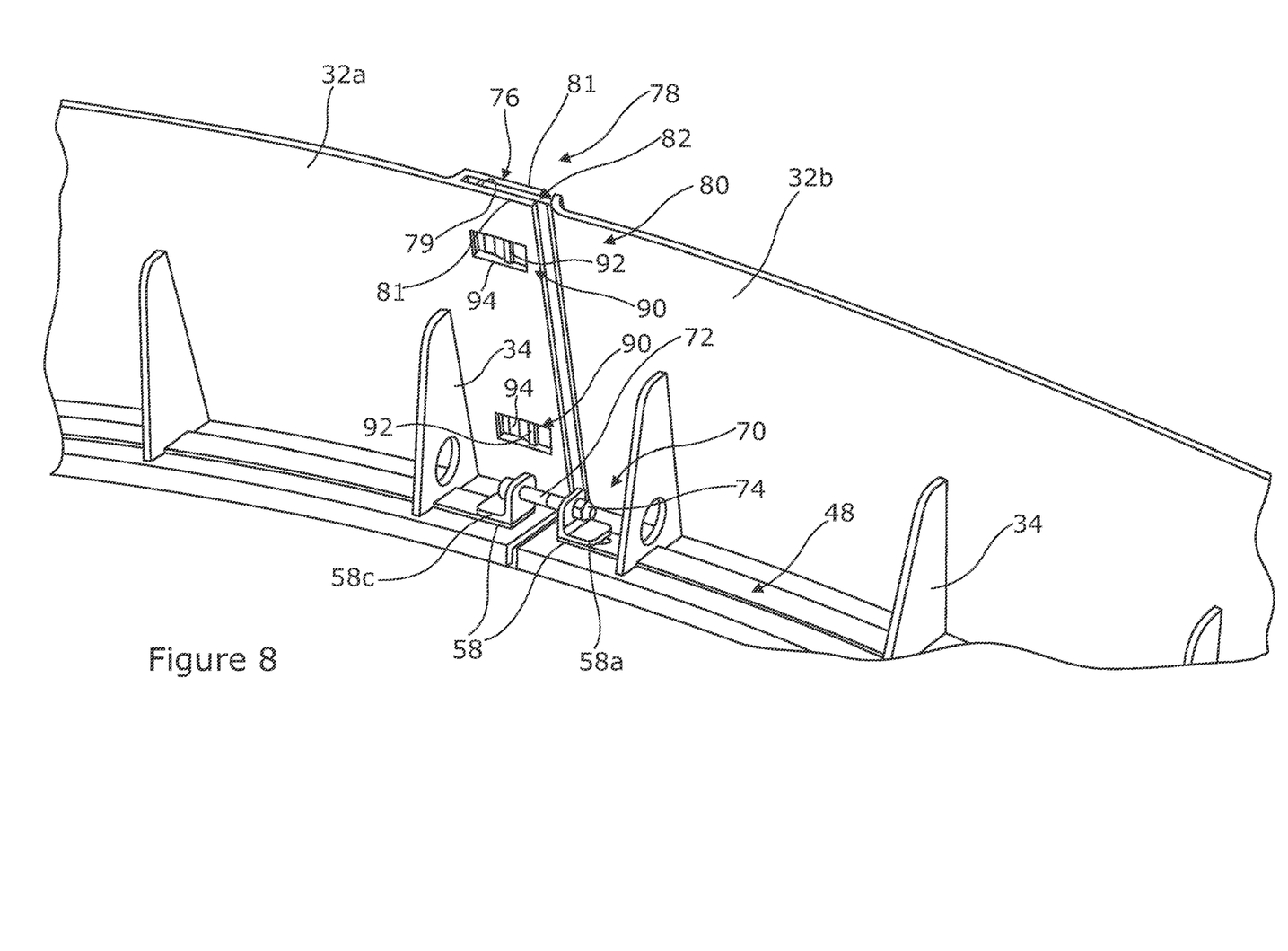
FIG. 8 is a view from underneath of one end of the blade root cover section shown in FIG. 7.

Reference will now also be made to FIGS. 6, 7 and 8 which show various perspectives of an example of one of the blade root cover segments 32 which form the complete assembly of the blade root cover 30.

As has been mentioned, in the illustrated embodiment the blade root cover 30 comprises twelve blade root cover segments 32, and so each of the segments 32 spans approximately 30 degrees of arc when considering a circular section through the blade root portion 24. Due to the large diameter of the blade root portion 24 and the relatively small circumferential span of the blade root cover segment 32, the flange 40 of the segment 32 has a shallow curvature, as is discernible from the Figures.

As can be seen the blade root cover segment 32 has an elongate shape and has a first end 44 and a second end 46 which define the opposite extremities of the flange 40 and the wall 42. Advantageously each of the blade root cover segments 32 is configured to connect with an adjacent, and substantially identical, blade root cover segment 32 in order to form a complete blade root cover 30, as is shown in FIG. 4. Expressed another way, the blade root segments are mutually-connectable. In addition to being connectable to like segments, each blade root cover segment 32 is provided with tensioning means 48 that is operable, when a set of blade root cover segments 32 are assembled together, to form a complete ring-shaped blade root cover 30, to apply tension between each of the blade root cover segments 30 in order to 'pull' them tightly against the blade root portion 24 on which they are mounted.

As shown in FIGS. 6 and 8, the tensioning means 48 is a tensioning band 50 associated with the flange 30. The tensioning band 50 takes the form of a strip-shaped piece of high tensile material such as steel, which is retained on the flange 30 so that it forms a part of the blade root cover segment 32 in that it cannot be easily removed during handling or assembly. Importantly, the increased tensile strength of the tensioning band 50 provides the blade root cover 30 with the ability to withstand the hoop stresses generated by virtue of the tension needed for the assembled blade root cover 30 to apply a radially inward directed compressive force to the blade root portion 24 in order to maintain the blade root cover 30 in a substantially fixed axial position on the blade. Since the compressive force is generated by the tensioning band 50, the rest of the blade root cover segment 32 may be made of a relatively lightweight material such as a plastic. The precise material is not crucial to the invention but it is envisaged that the material will be cost effective to source and manufacture. Options may be polyamides, polyethylene, and other thermoplastic polymers, by way of non-limiting example, which may be suitable for producing the segment in an injection moulding process. Forming the blade root cover segment by injection moulding is a very time efficient and material efficient way to fabricate the article. Since all of the segments are for all intents and purposes identical, the segments lend themselves to being mass produced in this way. The strength of the plastic parts of the blade root cover segments is not crucial because they simply need to main structural integrity when installed on the blade; they're not as such load bearing elements. The constrictive load to fasten the assembled blade root cover to the blade is generated by the tensioning band which is, as described, preferably made from a material with higher tensile strength.

It is also envisaged that the body of the blade root cover segment would be suitable for an additive manufacturing process.

In the illustrated embodiment, the tensioning band 50 is retained on the upper surface of the flange 40. This may be achieved in various ways. As shown, the tensioning band 50 sits within a longitudinal channel 52 defined on the upper surface of the flange 40. The channel 52 extends along the length of the flange 40 in this embodiment. Clips or other suitable retaining members may be used to ensure that the tensioning band 50 remains situated in the channel 52. In the illustrated embodiment a plurality of upstanding fins or webs 54 span between the wall 42 and the flange 40. The webs 54 serve two purposes. Firstly, they provide additional rigidity to the wall 42 with respect to the flange 40 as they reduce the stress acting through the elbow 44. Secondly, the lower end of the webs 54 extend over the channel 52 and prevent the tensioning band 50 from lifting away from the channel 52. Suitable apertures (not shown) may be provided in the webs for the purposes of allowing someone to grip the cover segment more easily during installation. The apertures can also be used temporarily to tie a line to the cover segment during installation.

Each end of the tensioning band 50 is provided with connection means 56 in the form of brackets 58 located at the first and second end of the tensioning band 50. In this embodiment the brackets 58 are shown as being L-shaped in form and as such comprise a base portion 58*a* adjacent the tensioning band 50 and a connection flange portion 58*a* that extends vertically upright from the base portion 58*a*. This is best seen in FIG. 8. The base portion 58*a* also includes a retention lug 60 (see FIG. 7) on its underside that extends through corresponding apertures (not shown) defined in the tensioning band 50 and the flange 40. As can be seen the retention lug 60 has a head 62 which has an obround or stadium shape and so forms a twist lock feature for the bracket 56. In this way, therefore, the brackets can be used to lock the tensioning band 50 onto the flange 40 by using a quarter-turn fixing method. The bracket 56 is therefore releasably retained on the flange 40 and also serves to retain the tensioning band 50 against the flange 40.

As has been mentioned above, each of the blade root cover segments 32 connects to a substantially identical segment in order to form a complete blade root cover, as shown in FIGS. 3 and 4. Further details of the connection are shown in FIG. 8 which shows a first blade root cover segment 32*a* engaged with and connected to a second blade root cover segment 32*b*.

In the centre of FIG. 8, the respective tensioning bands 50 of each of the first blade root cover segment 32*a* and the second blade root cover element 32*b* are coupled together at their respective brackets 58. The tensioning means 48 comprises a means for coupling and applying tension between each tensioning band 50. In part, this function is provided by the brackets 58, but it is also provided by an adjustable tensioning mechanism or 'adjuster' 70 that couples each of the brackets 58 together. In the illustrated embodiment, the adjuster 70 is shown as a threaded bolt 72 having a nut 74 that is visible to the right of the two brackets 58. Rotation of the nut 74 reduces the separation between the brackets 58 and so pulls the two blade root cover segments 32 more firmly together.

It should be appreciated at this point that the adjuster 70 may be provided by different means. For example, different threaded mechanisms may be used such as turnbuckle style devices. Also, it is envisaged that suitable ratchet devices could be used to perform the same function of applying tension between the adjacent tensioning bands 50.

One benefit of the blade root cover 30 is apparent particularly from FIG. 5. Here, it can be seen that the adjuster 70 is accessible from the direction of the spinner 18, by virtue of the fact that the lee or 'sheltered' part of the blade root cover 30 adjacent to the annular gap 28. Therefore, access to the blade root cover segments 32 can be obtained through the interior of the spinner 18 so that maintenance technicians can make adjustments to the blade root cover 30 or even replacement of blade root cover segments 32 in situ, without needing the blade root cover 30 to be removed from the blade.

It will be appreciated by viewing FIG. 8 that the neighbouring blade root cover segments 32*a*, 32*b* are configured to mate with each other to improve the connection between them and also to assist in the process by which the individual cover segments 32 are joined together.

More specifically, a first end 76 of the wall 42 of the blade root cover segment 32*a* features a female mating feature 78 whereas a second end 80 of the wall 42 features a male mating feature 82. In this embodiment the female mating feature 78 is a trough or channel 79 that is defined along the first end 76 of the wall 42 between parallel wall portions 81, whereas the male mating feature 82 is a rib or blade that is defined along the second end 80 of the wall, in effect, an extension to the wall 42 and which is configured and dimensioned to be received in the female mating feature 78.

The complementary mating features 78,82 are therefore slidable with respect to one another as the neighbouring blade root cover segments 32 are brought together. In FIG. 8 the female mating feature 78 of the first blade root cover segment 32*a* is shown engaged with the male mating feature 82 of the second blade root cover segment 32*b*, but it will be appreciated that both mating features 78,82 are shown on the same segment in FIG. 6.

A benefit of the complimentary mating feature 78,82 is that they help to locate and guide two adjacent blade root cover segments 32 into position during assembly. What is more, during the tensioning process, the mating features 78,82 ensure that the cover segments 32 are locked together and cannot move out of step with one another. A further benefit is that the interlocking nature of the adjacent wall edges means that there are no gaps in the blade root cover through which water can pass. Although the illustrated embodiment depicts the currently preferred complimentary mating features, it is envisaged that a similar effect could be achieved through other means. For example a type of interlocking connector could be provided on the flange edges for connection with adjacent flange edges.

Optionally, and as shown in the illustrated embodiment, the complimentary mating features 78,82 also comprise a locking system 90 so that the mating features mutually interlock once they have been engaged by more than a predetermined amount. This is useful during the assembly process because adjacent blade root cover segments 32 can be locked together in a daisy-chain fashion whilst blade root cover assembly is being built up.

As shown in FIGS. 6 to 8, the locking system in this embodiment includes a pair of locking wedges 92 defined on the male mating feature 82 and a respective pair of locking windows 94 defined on the female mating feature 82. The locking wedges 92 are oriented so that a shallow inclined face 92*a* thereof is directed towards a neighbouring blade root cover segment, whereas a sharply inclined face 92*b* is directed away from the neighbouring segment. More or fewer locking wedges 92 may be provided as desired.

In use, as the male mating feature 82 is inserted into the female mating feature 78, the locking wedges 92 force apart the parallel wall portions 81 and form a snap fit into the respective locking windows 94.

From the above discussion, it will be appreciated that the complementary mating features 78,82 and the tensioning means 48 function together during assembly of the complete blade root cover firstly to hold the individual blade root cover segments 32 together, but also to apply tension between the segments in order to force the blade root cover 30 to constrict onto the blade so as to be held securely in place. As shown in FIG. 3, once the blade root cover 30 is located in place to cover the gap between the blade root portion 24 and the blade aperture in the spinner, water ingress into the hub is reliably prevented. In a further enhanced aspect, the blade root cover 30 is equipped with sealing means comprising an integral surface seal 96 which is configured to seal against the blade surface when the blade root cover is in position.

As best shown in FIG. 7, the surface seal 96 is embodied by first and second gasket elements 98. The gasket elements 98 are mounted in respective channels 100 defined on the underside of the flange 40 so that they press against the blade root portion 24 when the blade root cover element is installed. The respective channels 100 and therefore also the gasket elements 98 extend longitudinally along the flange 40 from its first end and its second end, that is to say in the length direction of the flange. When the blade root cover is assembled onto the blade, the respective gasket elements 98 of the blade root cover segments 32 form a continuous waterproof seal between the flange 40 and the blade root portion 24 to prevent water passing through this route. This is beneficial to known approaches which involve the use of a curable polymer to seal a blade root cover to a blade. Although two gasket elements are shown in the illustrated embodiment, it is envisaged that a single gasket element may also be effective.

Although the tensioning means 48 discussed above is envisaged to be sufficient to secure the assembled blade root cover 30 to the blade, as a further measure one or more of the blade root cover segments may be provided with additional securing means 102. This is shown in FIG. 6 in the form of an eyelet 104 which defines an aperture through which an appropriate fastener can pass to screw into the blade. As shown here, the eyelet 104 is a relatively flat block that projects outwardly from the flange 40 along the plane of the flange 40. Optionally, appropriate mounting points such as polymer blocks can be moulded into the blade to serve as sacrificial screw points in the blade to avoid possible damage to the composite material of the blade skin.

It is envisaged that a comparable solution could be provided by a mounting block that is bonded to the blade, e.g. using a liquid adhesive or a double-sided adhesive tape with suitable configurational changes to the eyelet 104. However, instead of the eyelet 104, a clamping member (not shown), which could be plate-like in form, could be used to attach to the mounting black and span across to the cover segment to apply a downward and/or lateral force to it as an additional measure to hold it in place. Adjustment in the circumferential and spanwise directions could be provided. With such a solution drilling a hole in the blade may be avoided.

Figure 9A:
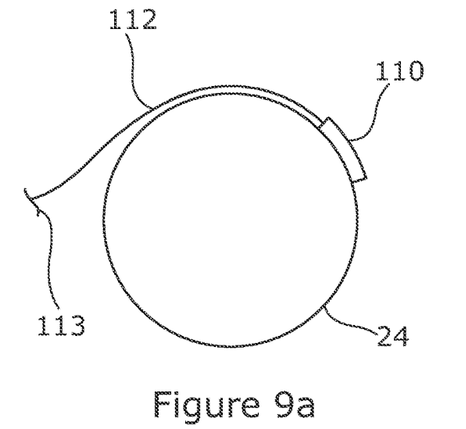
FIGS. 9a to 9f are a series of illustrative views showing a process by which the blade root cover is mounted to a blade.
Figure 9B:
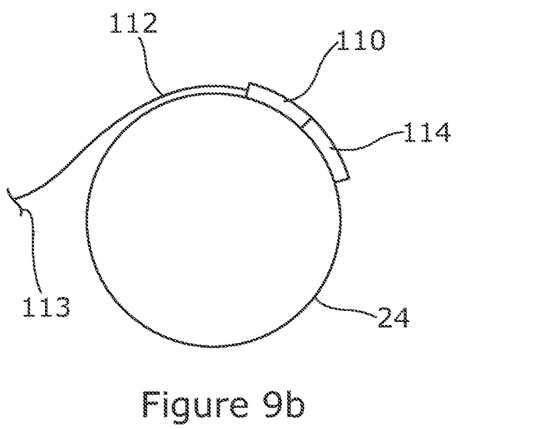
Figure 9C:
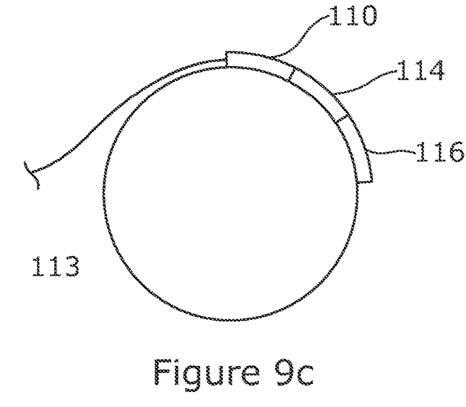
Figure 9D:
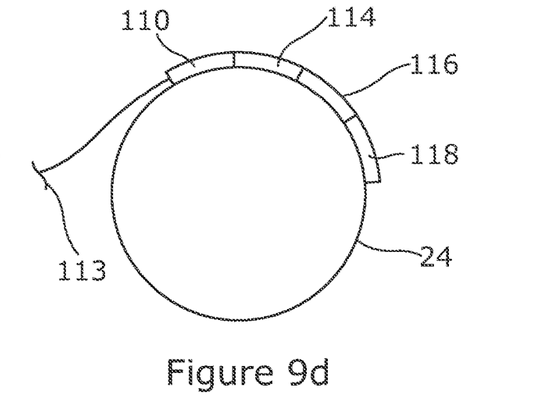

FIGS. 9a to 9f demonstrate a method of assembling a blade root cover 30 in accordance with the embodiments described above. It will be appreciated that the modular nature of the blade root cover 30 of the invention promotes a stepwise assembly process which is particularly convenient. In FIG. 9a, a single blade root cover segment 110 is shown offered up the blade root portion 24. The blade root cover portion is attached to a tether or line 112 that is slung over the top of the blade root portion 24. The line 112 may be secured to a suitable stop or support 113 such as a winch (not shown) or simply held in the hand of an assembly worker (not shown). The blade root cover segment 110 can then be pulled by the line 112 so that it is placed into a higher position on the blade root portion 24 at which point a second blade root cover segment 114 can be offered up the blade root portion and secured to the first blade root cover segment 110. This is shown in FIG. 9b. At this point the complementary mating features 78,82 of the blade root cover segments 110,114 will be engaged with one another and the brackets 58 may also be secured by the adjuster 70, as discussed above, although this detail is not shown in FIGS. 9a-9f. FIGS. 9c and 9d show a continuance of this process of the gradual build up of the blade root cover by adding more and more blade root cover segments, here shown as 116 and 118. Control over the partially assembled blade root cover can be maintained by suitable tension on the line 112.

Figure 9E:
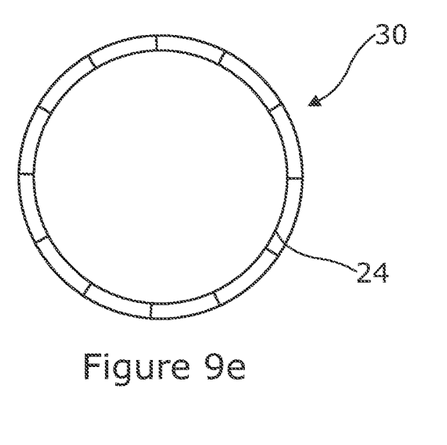
Figure 9F:
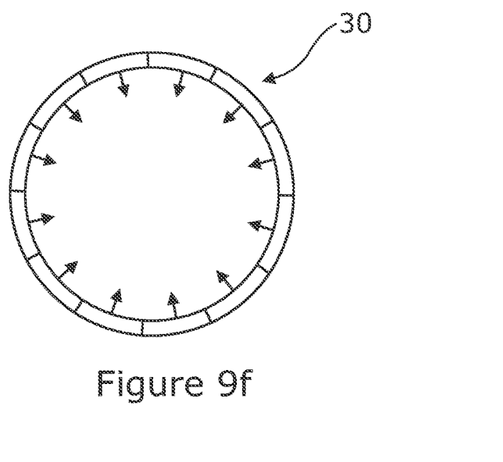

A completed blade root cover 30 is shown in FIG. 9e, at which point the adjusters 70 that span respective pairs of blade root cover segments may be loosely adjusted to allow the blade root cover 30 to be positioned correctly. Possibly, most of the adjusters can be fully tightened at this point, conveniently leaving only one or two adjusters to be tightened in order to place the tensioning band in sufficient tension to hold the blade root cover tightly in position on the blade root portion 24. FIG. 9f depicts the final tightening of one or more adjusters 70, as illustrated by the radially inward direct arrows, to achieve a slight radial constriction of the blade root cover 30 therefore securing it to the blade root portion 24.

Once this has been achieved, one of more of the blade root cover segments 32 may be secured to the blade by suitable fasteners through the eyelets 104.

Figure 10:
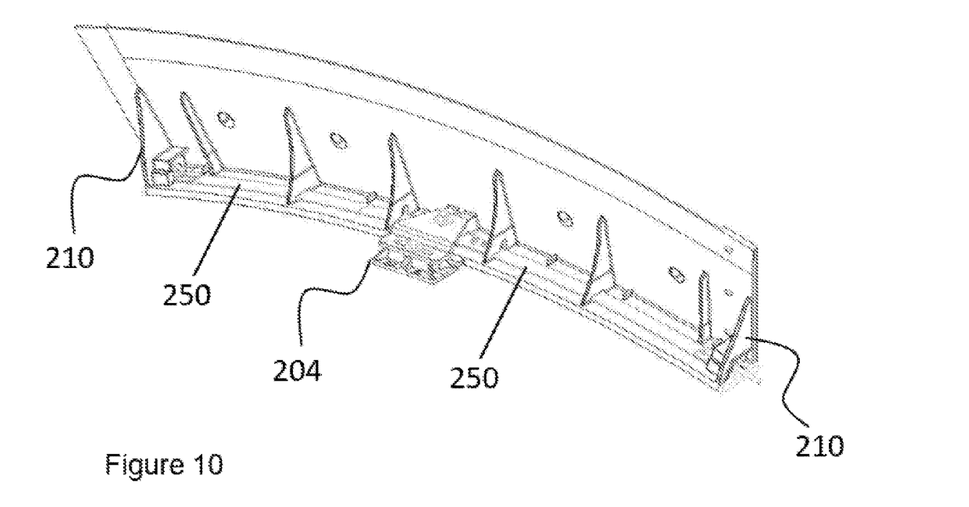
FIG. 10 is a perspective view of an alternative embodiment of a blade root cover.

FIG. 10 shows an alternative blade root cover with variations in particular with respect to fastening of the blade root cover to the blade and fastening of blade root cover segments to each other. The differences as to FIG. 6 will be explained in more detail here below, whereas items similar to FIG. 6 are not highlighted here.

In FIG. 6 was mentioned that an additional securing means 102 could be an eyelet 104 through which an appropriate fastener can pass to screw into the blade. An alternative includes a mounting block 204 fixed to the blade by e.g. liquid adhesive or a double-sided adhesive tape. This block will be described in more detail with reference to FIGS. 11a and 11b below.

Further, in FIG. 6 was shown an embodiment in which the tensioning band 50 was one single piece. Below with reference to FIGS. 11-13 alternative embodiments of the tensioning band will be described in detail. Finally, it is noted that the webs 54 from FIG. 6 are also slightly amended in the embodiment of FIG. 10, namely two additional webs 210 on the outermost part have been introduced. This strengthens the system even more.

Figure 11A:
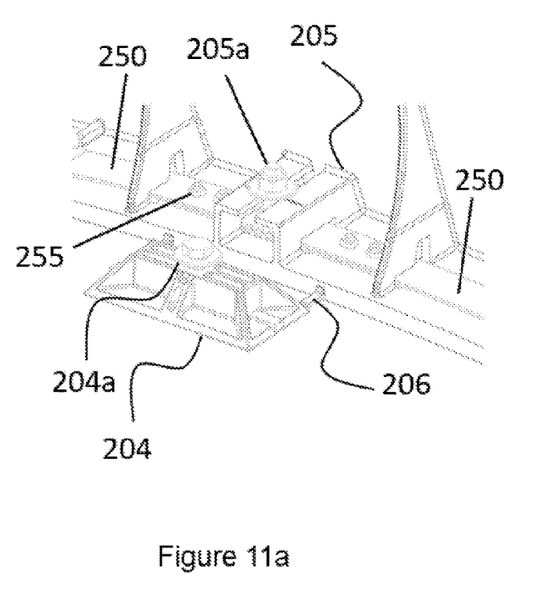
FIGS. 11a and 11b show the central part of FIG. 10.
Figure 11B:
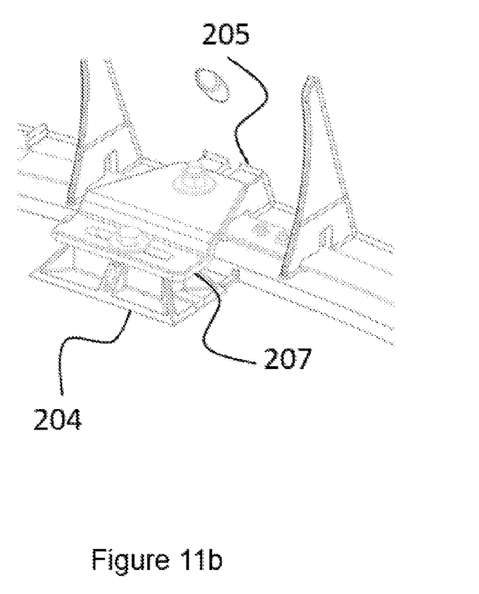

FIGS. 11a and 11b show the alternative additional securing means 102 mentioned above in more detail. A mounting block 204 is glued to the blade, including a first bolt 204a. The blade root cover segment in this embodiment includes a segment block 205 suitable for including a bolt 205a. Distance elements 206 may be in place to ensure a correct distance and to enable adjustment afterwards to desired distances. FIG. 11b also discloses a bracket to connect the two bolts 204a and 205a, and back/forth and sideways adjustment is enabled through slits in at least one of the elements.

Also, in FIGS. 10 and 11 can be seen a version of the tensioning band 50, comprising multiple tensioning band parts 250. In one version as shown, two similar tensioning band part 250 are positioned in each their end of the blade root cover segment, and as best seen in FIG. 11a, these are connected to each other in the area of the segment block 205. This connection is shown with two bolts 255 on each side of the segment block 205; however, other means of connection could be used as well, and a third band part could be a centre piece.

Figure 12:
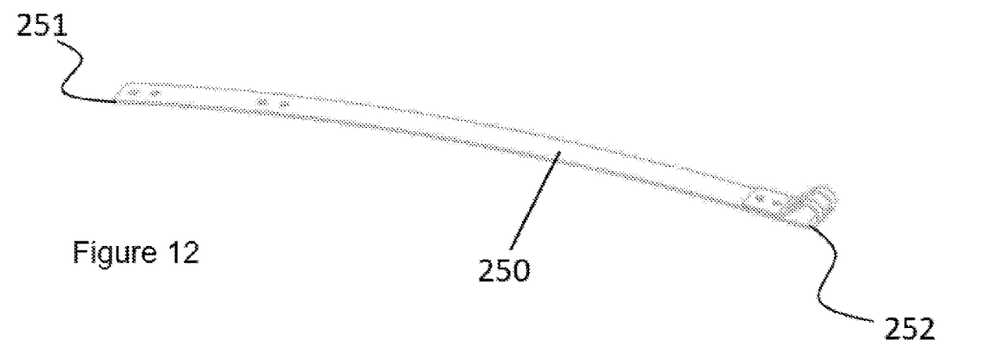
FIG. 12 is a perspective view of a tensioning band part.
Figure 13:
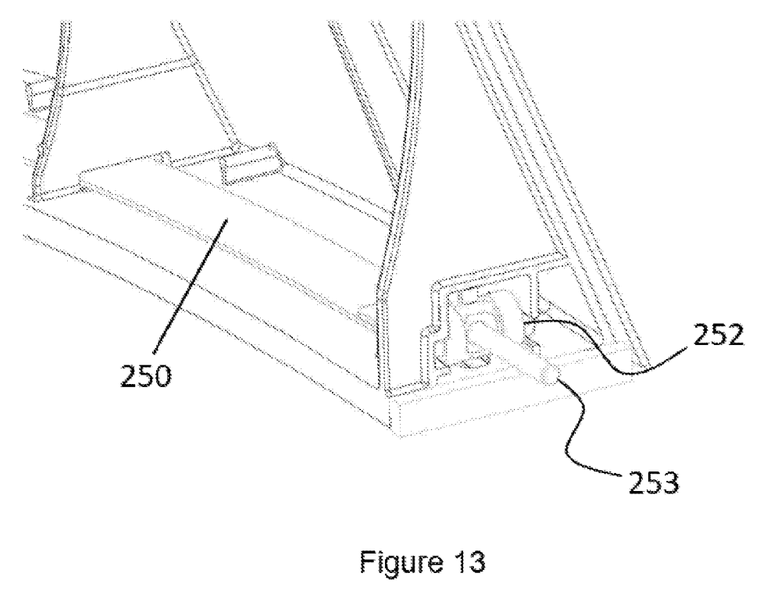
FIG. 13 shows an end part of FIG. 10.

One single tensioning band part 250 is shown in FIG. 12, comprising an inner end 251 showing the four holes for connection to another band part, as described above. In the other, outer, end 252, the tensioning band part is shaped to establish two loops acting as part of a connection means. As seen in FIG. 13, a fixing mechanism 253 can be held in between these two loops and from this connect safely to a neighbouring blade root cover segment in the same way as shown in FIGS. 6 and 8, where brackets were used. An advantage with the FIG. 12 design compared to FIGS. 6 and 8 is believed to be that the pulling force from the adjustable tensioning mechanism or 'adjuster' (bolt and nut similar to described in FIG. 8) is better aligned with the tensioning band. It is noted that all parts of the connection means can be made from steel.

The skilled person will appreciate that various modifications could be made to the illustrated embodiments discussed above without departing from the inventive concept, as defined by the claims.

For example, one enhancement to the illustrated embodiment is for there to be provided stiffening ribs on the cover segment. These may be formed in any appropriate way that would provide the cover segment with increased stiffness in a certain direction. One option is for such stiffening ribs to be defined on the underside of the cover segment, for example between the gasket channels.

The invention claimed is:

1. A blade root cover segment suitable for fitting to a wind turbine blade to span a gap between the blade and a spinner cover, the blade root cover segment extending in a circumferential direction between a first end and a second end, the blade root cover comprising:
   a curved flange for abutting against a correspondingly curved surface of the wind turbine blade;
   a cover wall extending from the flange;
   a tensioning band associated with the flange, the tensioning band extending in the circumferential direction between a first end and a second end, wherein the first end of the tensioning band is proximate to the first end of the blade root cover segment and the second end of the tensioning band is proximate to the second end of the blade root cover segment, and wherein the first end and the second end of the tensioning band include connection means for connecting with and applying tension between a like blade root cover segment.

2. The blade root cover segment of claim 1, wherein a first end and a second end of the cover wall include complementary mating features.

3. The blade root cover segment of claim 2, wherein the complementary mating features includes a locking mechanism.

4. The blade root cover segment of claim 2, wherein the complementary mating features includes a male feature on the first end of the cover wall and a female feature on the second end of the cover wall.

5. The blade root cover segment of claim 1, wherein the flange comprises sealing means for sealing against a blade surface.

6. The blade root cover segment of claim 5, wherein the sealing means comprises at least one gasket element.

7. The blade root cover segment of claim 6, wherein the gasket element extends along the length direction of the blade root cover segment.

8. The blade root cover segment of claim 5, wherein the gasket element extends between the first end of the blade root cover segment and the second end of the blade root cover segment.

9. The blade root cover segment of claim 1, wherein the tensioning band is retained on the blade root cover segment.

10. The blade root cover segment of claim 9, wherein the tensioning band is retained in a channel in the flange of the blade root cover segment.

11. The blade root cover segment of claim 1, further comprising one or more strengthening webs extending between the flange and the cover wall.

12. The blade root cover segment of claim 11, wherein the one or more strengthening webs retain the tensioning band on the blade root cover segment.

13. The blade root cover segment of claim 1, wherein the connection means of the tensioning band includes a bracket that is connected to the flange.

14. The blade root cover segment of claim 1, wherein the connection means includes an adjustable connector that is configured to connect to an adjacent tensioning band and adjust the separation therebetween.

15. The blade root cover segment of claim 1, wherein the flange includes an aperture for a fastener through which the flange can be fastened to a blade.

16. The blade root cover segment of claim 1, wherein the tensioning band is formed from a material that has a higher tensile strength compared to that of the material from which the flange and wall are made.

17. The blade root cover segment of claim 1, wherein the tensioning band is a single component for each blade root cover segment.

18. The blade root cover segment of claim 1, wherein the tensioning band is comprised of multiple parts for each blade root cover segment.

19. The blade root cover segment of claim 1, wherein the wall and flange are made of plastics.

20. The blade root cover segment of claim 1, wherein the wall and the flange are injection moulded as a single article.

21. A blade root cover comprising a plurality of blade root cover segments as claimed in claim 1 joined end-to-end into a loop.

22. A wind turbine generator comprising a nacelle which rotatably supports a hub including at least one blade, wherein the blade comprises a blade root cover as claimed in claim 21.

23. The wind turbine generator of claim 22, wherein the blade root cover is attached to the blade by one or more fasteners that penetrate into the blade.

24. The wind turbine generator of claim 23, wherein the one or more fasteners penetrate into a securing block embedded in the blade that is made out of a different material to the blade.

25. The wind turbine generator of claim 22, wherein the blade root cover is attached to the blade by the use of a liquid adhesive or a double-sided adhesive tape.

26. A method of installing a blade root cover on a wind turbine blade, comprising:
   providing a plurality of separate and mutually-connectable blade root cover segments each according to claim 1,
   supporting a first blade root cover segment of the plurality of blade root cover segments on the blade,
   creating a blade root cover assembly by offering up a second blade root cover segment of the plurality of blade root cover segments to the blade into a position adjacent to the first blade root cover segment, and connecting the second blade root cover segment to the first blade root cover segment using connection means of each respective blade root cover segment, and
   connecting further blade root cover segments of the plurality of blade root cover segments to the blade root cover assembly of first and second blade root cover segments to increase the circumferential length of the blade root cover assembly until a complete blade root cover is formed.

27. The method of claim 26, wherein the step of supporting the first blade root cover segment on the blade includes suspending the first blade root cover element from a support that is separate to the blade.

28. The method of claim 27, wherein suspending the first blade root cover segment includes running a tether line from the first blade root cover segment to the support over an upper part of the blade root.

29. The method of claim 26, further comprising moving the first blade root cover segment in a step-wise manner whilst connecting the further blade root cover segments to the blade root cover assembly.

30. The method of claim 26, wherein each of the blade root cover segments includes respective tensioning means, wherein the method further comprises, when the complete blade root cover has been assembled, applying circumferential tension to the blade root cover by way of the tensioning means.

31. The method of claim 26, further comprising fixing one or more of the blade root cover segments to the blade using a respective blade fastening element.

32. A blade root cover segment suitable for fitting to a wind turbine blade to span a gap between the blade and a spinner cover, the blade root cover segment having a first end and a second end, and comprising:
- a curved flange for abutting against a correspondingly curved surface of the wind turbine blade;
- a cover wall extending from the flange;
- one or more strengthening webs extending between the flange and the cover wall; and
- a tensioning band associated with the flange, wherein the tensioning band comprises a first end proximate to the first end of the blade root cover segment and a second end proximate to the second end of the blade root cover segment, wherein the first end and the second end of the tensioning band include connection means for connecting with and applying tension between a like blade root cover segment, and wherein the one or more strengthening webs retain the tensioning band on the blade root cover segment.

* * * * *